Nov. 7, 1961   L. W. SHUTTS   3,007,312
COMBUSTION LINER LOCATER
Filed Nov. 23, 1959   3 Sheets-Sheet 1
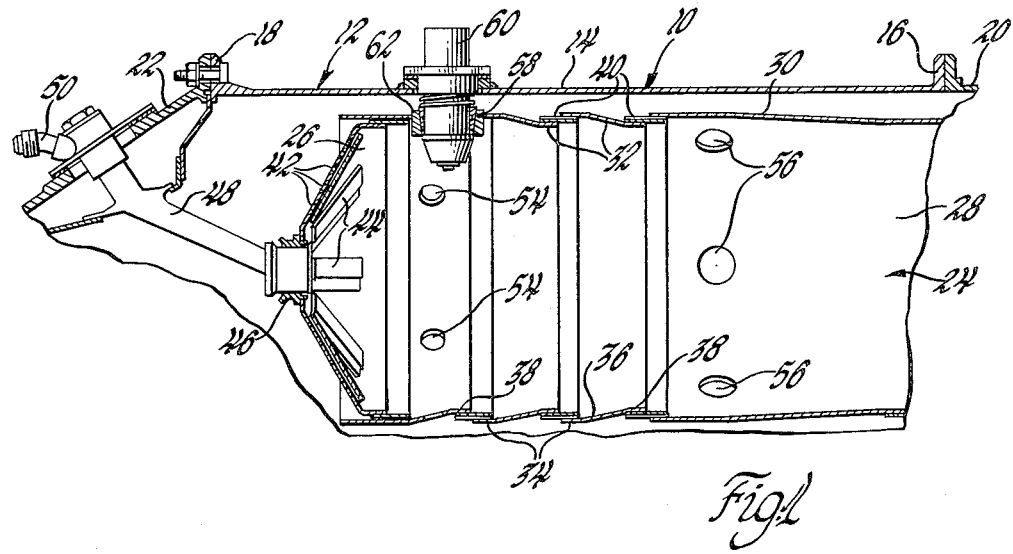
Fig.1
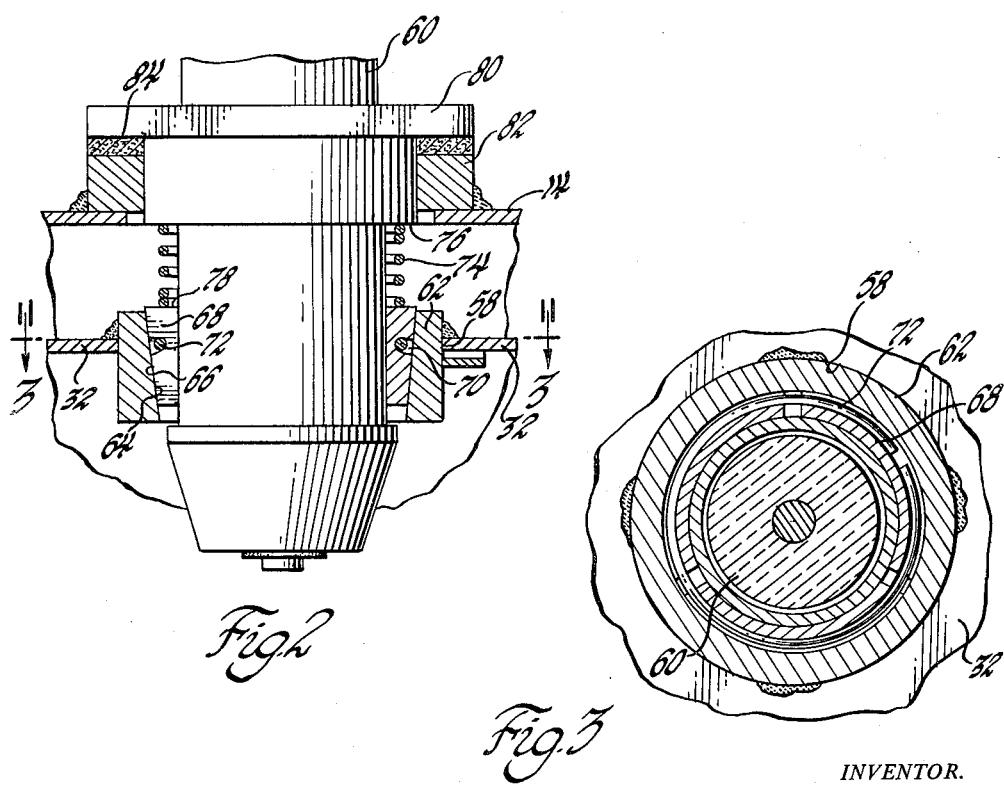
Fig.2
Fig.3
INVENTOR.
Leroy W. Shutts
BY
Robert E. McCollum
ATTORNEY INVENTOR.
Leroy W. Shutts
BY
Robert E. McCollum
ATTORNEY

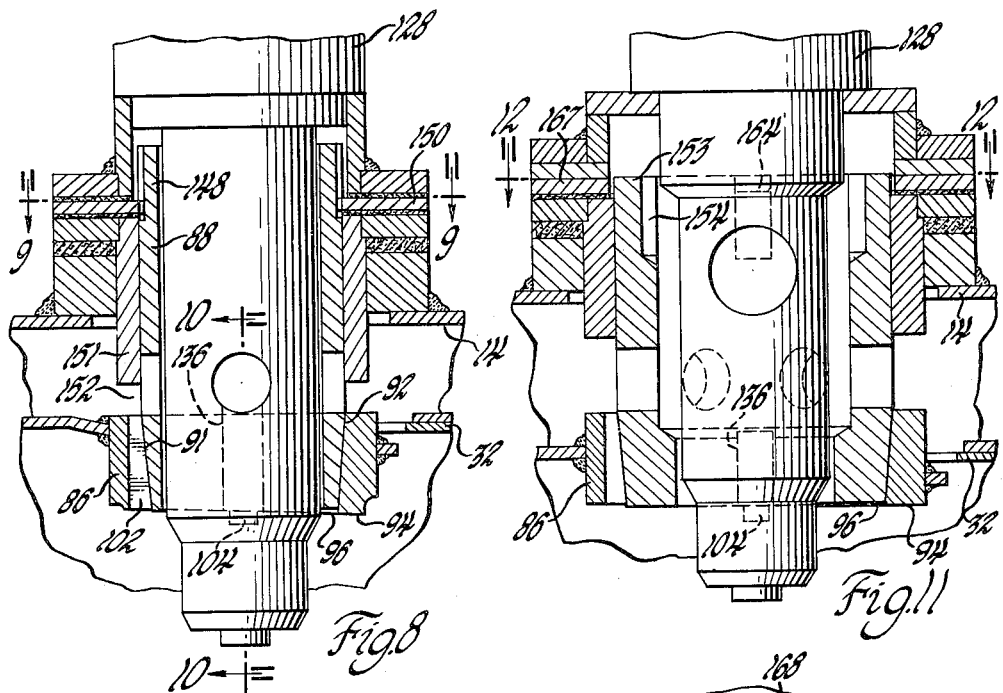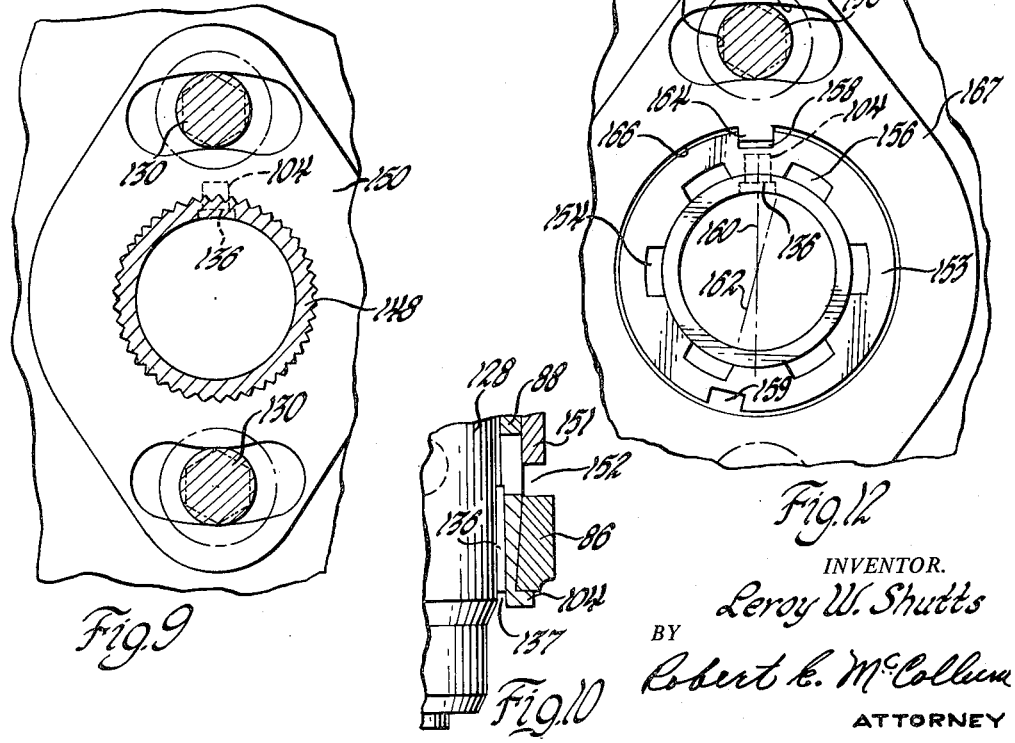

United States Patent Office 3,007,312
Patented Nov. 7, 1961

3,007,312
COMBUSTION LINER LOCATER
Leroy W. Shutts, Indianapolis, Ind., assignor to General Motors Corporation, Detroit, Mich., a corporation of Delaware
Filed Nov. 23, 1959, Ser. No. 854,833
10 Claims. (Cl. 60—39.82)

This invention relates to a multi-member connecting means for positioning one member with respect to another, and in particular, to a means for axially positioning a combustion liner with respect to the engine casing of a gas turbine engine, and means for rigidly connecting the two together to prevent wear and fretting therebetween.

More specifically, this invention relates to a combustion chamber of the type having flame tubes or combustion liners therein and an igniter plug having one end projecting through the liner and the other end fixed to the chamber wall. In a construction of this type, the liner opening into which the plug projects is frequently of a size to permit a slight sliding motion between the liner and plug. Frequently, however, vibration due to the combustion process causes a "hammering" of the parts at this point resulting in considerable wear and fretting of the parts with respect to each other and eventually failure of the combustion liner as well as the igniter plug casing.

The present invention eliminates this "hammering" effect and consequential wear by providing a rigid connection between the liner and the igniter plug casing while at the same time permitting radial growth of the liner and igniter casing at the outer engine casing structure.

Therefore, it is an object of this invention to provide a means for interconnecting a combustion liner and a combustion chamber casing to substantially prevent relative movement therebetween while substantially eliminating wear between the interconnected parts.

Figure 4:
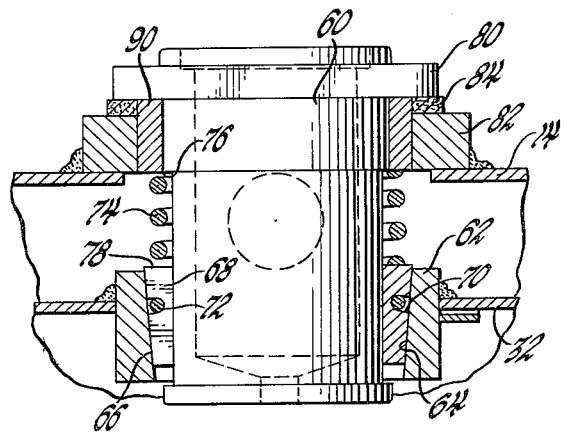
Figure 6:
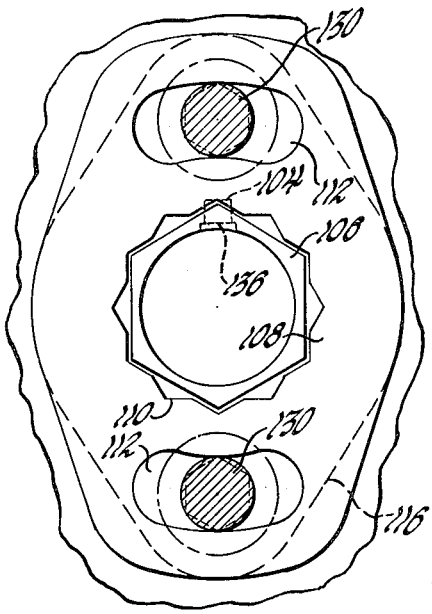
Figure 5:
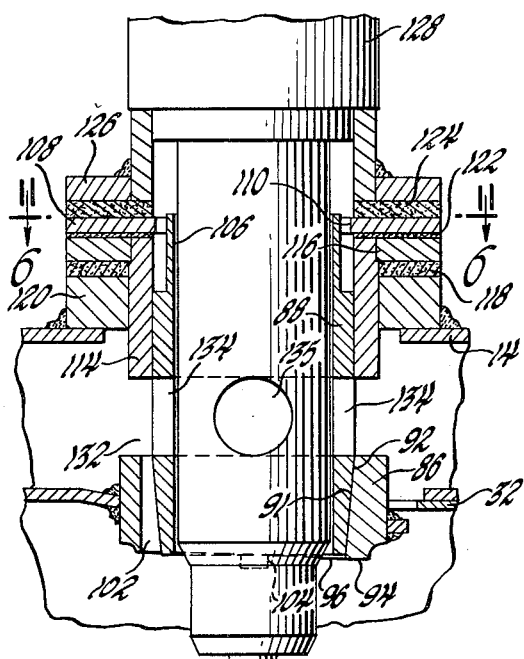
Figure 7:
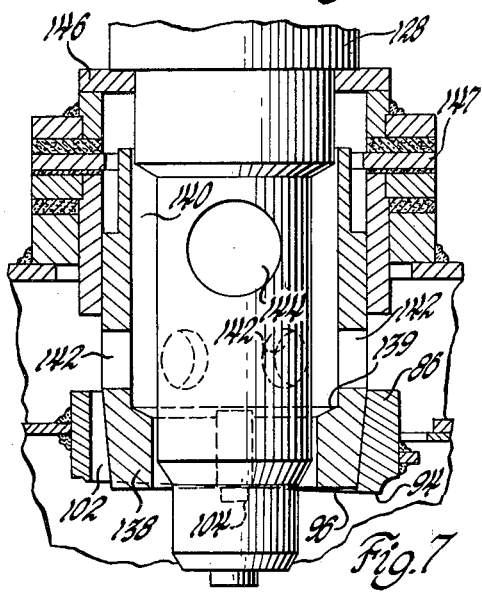

Other features, objects, and advantages will become apparent upon reference to the detailed description of the invention which follows, and to the drawings illustrating the preferred embodiments of the invention, wherein:

FIGURE 1 is a schematic cross sectional view of a portion of a gas turbine engine illustrating one embodiment of the invention, FIGURE 2 is an enlarged view of a detail of FIGURE 1, FIGURE 3 is a cross sectional view taken on a plane as indicated and viewed in the direction of the arrows 3—3 of FIGURE 2, FIGURE 4 is a modification of the FIGURE 2 embodiment, FIGURE 5 is an enlarged cross sectional view of another embodiment of the invention, FIGURE 6 is a cross sectional view taken on a plane as indicated and viewed in the direction of the arrows 6—6 of FIGURE 5, and FIGURE 7 is a modification of the FIGURE 5 construction, FIGURE 8 is another modification of the FIGURE 5 construction, FIGURE 9 is a cross-sectional view of a portion of the FIGURE 8 construction taken on a plane as indicated and viewed in the direction of the arrows 9—9 of FIGURE 8, FIGURE 10 is a cross sectional view of a portion of the FIGURE 8 construction taken on a plane as indicated and viewed in the direction of the arrows 10—10 of FIGURE 8, FIGURE 11 is a modification of the FIGURE 7 construction, and FIGURE 12 is a cross-sectional view of a portion of the FIGURE 11 construction taken on a plane indicated by and viewed in the direction of the arrows 12—12 of FIGURE 11.

Referring to the drawings, and more particularly to FIGURE 1, there is shown schematically therein a combustion section 10 for use in this particular illustration in a gas turbine engine 12, only a portion of which is shown. The outer radial extent of combustion section 10 is defined by the outer annular engine casing 14 flanged at its opposite edges 16 and 18 for joinder with a similarly flanged transition section 20 at one end and a diffuser section 22 at its opposite end.

The combustion section 10 illustrated is of the cannular type having a number of circumferentially spaced axially extending combustion cans 24 positioned therein (only one shown), each having a dome 26 at one end cooperating with a diffuser section 22 and a portion 28 at the other end cooperating with a turbine section (not shown).

The combustion cans, liners, or flame tubes, as they are commonly called, each comprise an elongated tube 30 consisting of for the main part a number of annular hollow axially aligned sections 32, each having a forward axially extending edge portion 34 connected by a truncated cone portion 36 to a rear axially extending portion 38, the forward and rear edges of adjacent sections being joined together by a circumferentially corrugated axially extending annular spacer element 40 to which they are spot welded. The corrugations on the spacer element permit the cooler combustion chamber jacket air outside the liner to pass into and along the liner walls to insulate the walls from the flames and thereby prevent hot spots and subsequent burnout. The forward end of the liner receives the dome 26 therein shaped as shown and provided with a number of sets of circumferentially spaced air inlet holes 42, each set cooperating with a stepped air deflector or swirler plate 44 secured to the dome for imparting a swirling motion to the air to better mix the air with the fuel spray delivered into the liner through a fuel nozzle (not shown). The fuel nozzle radially supports the forward end of the liner and is secured in and to a nozzle guide 46 centrally of the liner, the nozzle being joined by a hollow supporting structure 48 to the engine casing as shown and projecting through the casing for connection to a fuel inlet line 50. The downstream ends 28 of the liners 24 are supported from the transition section casing in a suitable known manner by means (not shown).

The liners 24 are further provided with additional primary air holes 54 to admit air into the combustion zone to mix with the fuel spray, as well as secondary and dilution air holes 56 to reduce the temperature of the mixture. Further details of the liners beyond those described above will not be given since they are immaterial to an understanding of the invention, are known by those skilled in the art to which this invention relates, and do not constitute a part of this invention.

Referring to the subject matter of the invention, each of the combustion liners has an opening 58 through which an igniter plug 60 is inserted for ignition of the fuel-air mixture in the liner. Generally, only one or two of the circumferentially spaced liners have "live" igniter plugs, the remaining being fitted with "dummy plugs," with crossover tubes interconnecting the liners to propagate the flame therebetween.

In this type of construction, as stated previously, a slight clearance is frequently provided between the igniter plug and liner opening to permit the plug to be slideably inserted therein. This construction, however, often subjects the parts to a pounding effect during the combustion process due to vibration, which causes fretting or chafing and ultimate failure of the parts.

Several embodiments of the invention eliminating these objections are illustrated in FIGURES 1–12. FIGURES 1–3 illustrate a first embodiment wherein each of the combustion liners has a hollow boss or ferrule 62 secured within the opening 58 to a liner section 32 by welds or the like as shown, the ferrule having a tapered bore or ramp 64 adapted to cooperate with an externally tapered portion of wedge 66 of a split sleeve 68, both tapers converging in a direction towards the axis of rotation of the engine. The split sleeve is made in three arcuate pieces each having an external arcuate recess 70 for receiving therein a portion of a single snap ring 72 to maintain the sleeve portions together. Sleeve 68 is adapted to be assembled around the body portion of the igniter plug 60 as shown, and the two tapered portions are maintained in engagement with each other in a biased manner by a compression spring 74 surrounding the igniter plug 60 and positioned between an annular shoulder 76 on the plug and the outer face 78 of the sleeve. The plug has an attaching flange 80 thereon secured by cap screws (not shown) to a hollow boss 82 welded to the engine casing for rigidly connecting the plug to the casing and axially locating the liner. A gasket 84 between the flange and boss seals the connection.

The operation of this embodiment will be clear by reference to the figures, i.e., after the plug with the spring and sleeve assembled thereto is inserted through the ferrule and secured to the casing, the spring 74 exerts a force on the sleeve 68 to force the same into wedging engagement with the ferrule rigidly connecting the igniter plug and ferrule together. Thus, the combustion can is rigidly positioned both axially and radially with respect to the engine casing.

The plug illustrated in FIGURE 2 is of the "live" type. FIGURE 4 illustrates a construction similar to that of FIGURE 2, however, for use with a "dummy" plug. The FIGURE 4 construction differs from that of FIGURE 2 only in the shape of the plug, and the addition of a hollow annular spacer 90 to take up the clearance between the smaller diameter dummy plug and the ferrule. The assembly and operation remain the same as that of the FIGURE 2 illustration; therefore, a repetition of further details is believed unnecessary.

FIGURES 5 and 6 illustrate a different embodiment of the invention wherein a more positive locking engagement between the sleeve and ferrule is effected by shearing off or cutting the bottom of the ferrule at an angle with respect to the horizontal axis of the ferrule to provide a cam surface to cooperate with a lug on the bottom of the tapered sleeve so that upon rotation of the sleeve, the lug will be cammed radially inwardly towards the engine axis to wedge the sleeve into rigid engagement with the ferrule.

Referring to FIGURE 5, the liner ferrule 86 has a tapered bore 91 and sleeve 88 is externally tapered at 92 as in the FIGURES 1–3 constructions, with the tapers converging in a direction towards the axis of rotation of the engine. The bottom 94 of ferrule 86 also is machined to provide a surface 96 inclined with respect to the horizontal axis of the ferrule to define a ramp or cam surface. Furthermore, the bore of ferrule 86 is slotted at 102 as shown in FIGURE 5 to permit the slideable passage therethrough of a lug 104 machined on the bottom of the tapered portion 92 of the sleeve 88 and projecting laterally therefrom and beyond the major diameter thereof as shown. The lug is rotated upon rotation of tapered sleeve 88 by means to be described causing the lug to ride up on the cam surface 96 forcing the tapered sleeve portion 92 inwardly into tight engagement with the tapered bore portion 91 of the ferrule thus anchoring the sleeve to the ferrule.

The outer radial portion 106 of the sleeve is formed as a hexagon, as shown in FIGURE 6, so that a suitable tool, such as a hex wrench, can be fitted thereover to rotate the sleeve. Once the sleeve and lug have been rotated to provide the desired tightness between the sleeve and ferrule, the sleeve is locked in place by inserting over the hexagon portion a lockwasher 108 having a 12 point opening 110 and two elongated openings 112 diametrically opposite each other for a purpose to be described. The sleeve 88 per se has an internal opening of a diameter just slightly greater than that of the external diameter of the igniter plug to permit a sliding contact fit therebetween.

The sleeve 88 is guided in its rotative movement by being inserted through a sleeve 114 having a bearing surface internally thereof and a collar 116 brazed thereto. The collar has two diametrically opposite circular holes therein (not shown) adapted to align with similarly sized drilled holes in an annular sealing gasket 118 and an annular hollow boss 120 welded to the casing 14. The collar is adapted to overlie the boss and gasket and underlie a gasket 122, the lockwasher 108, a gasket 124, and a mounting flange 126 attached to an igniter plug 128 insertable through the tapered sleeve 88.

In the assembly of the FIGURE 5 construction, after the sleeve 114 with its collar 116 has been dropped into place on the gasket 118 and boss 120, sleeve 88 is then inserted through the ferrule with the lug 104 passing through slot 102. The sleeve is then rotated by any suitable hexagonal wrench causing the lug to ride against the inclined surface 96 thereby moving the sleeve downwardly into engagement with the ferrule. At this time, the lockwasher 108 with its 12 point hexagonal opening 110 can conveniently be slipped over the hexagonal end of the sleeve so as to align the two elongated holes 112 in the lockwasher with the circular holes (shown in dotted lines) provided in the gasket 122, collar 116, gasket 118 and boss 120. The gasket 124 and igniter plug attaching flange 126 are then dropped in place over the lockwasher, the cap screws 130 are then inserted in the aligned holes, and the entire assembly is locked to the engine casing to provide a rigid connection between the combustion liner, the igniter plug casing, and the engine casing. The 12 point hexagonal opening permits adaptation of the lockwasher to any final position of rest in the rotary motion of the tapered sleeve so that at least some portions of the elongated holes 112 will be aligned with the radial holes of the other members to permit insertion therethrough of the cap screws.

While the angle of the taper of the internally and externally tapered portions 91 and 92 of the ferrule and sleeve, respectively, as well as the cam surface 96 on the bottom of the ferrule, are all shown as exaggerated in the figures for a clearer understanding of the invention, the actual taper angles may be in the neighborhood of 2°24' with respect to the horizontal axis of the ferrule, for example, for the inclined surface 96, and 5° with respect to the vertical axis of the ferrule for the conical taper of portions 90 and 92, for example.

With respect to cooling of the igniter plug, as shown in FIGURE 5, the radial opening between the end of sleeve 114 and the upper radial face of ferrule 86 provides an air passage 132. The sleeve 88 at this location is provided with four holes 134 bored therein 90° apart and of a diameter equal to the radial height of the air passage to admit air into the two diametrically opposite holes 135 of the same diameter bored in the igniter plug casing.

Since the locking lug 104 is exposed to the hot flame, some means must be provided to cool the same to prevent it from being burned off; accordingly, a cooling channel 136 (see FIGURES 6, 9, 10 and 12) is provided by milling a slot in the internal wall of the sleeve 88, the slot extending between one of the air holes 134 and the space 137 immediately behind or downstream of the lug. Thus, the cooler combustion chamber jacket air which flows through the hole cools the lug and tends to insulate the lug from the hot flame. Furthermore, to obtain greater cooling of the igniter plug than is possible with the construction shown in FIGURES 5 and 6, the construction illustrated in FIGURE 7 is provided. This construction is substantially the same as that shown in FIGURES 5 and 6, except that the diameters of the parts are greater and the internal portion of the tapered sleeve 138 is recessed at 139 to provide an annular cooling passage 140 between the tapered sleeve and the igniter plug so that air entering through the inlets 142 provided in the sleeve will flow more effectively to the holes 144 in the igniter plug. In this illustration, six holes are bored in the tapered sleeve cooperating with two diametrically opposite holes provided in the igniter plug. This construction permits the location of the igniter plug holes in positions other than in axial alignment with the tapered sleeve air inlets, as is necessary in the FIGURES 5–7 construction for adequate cooling. Because of the larger diameter construction of FIGURE 7, a modified igniter plug attaching flange is provided having an additional annular flange 146 secured to the plug. The FIGURE 7 construction also permits the use of a shorter igniter plug.

Other than the changes described, the FIGURE 7 construction and assembly of the parts therein is similar to that of FIGURES 5 and 6, i.e., the tapered sleeve is rotated by a hexagonal wrench to tighten the sleeve in the ferrule after which the hexagonal holed lockwasher 147 is slipped thereon and the entire assembly including the igniter plug is fastened to the engine casing by the cap screws 130.

While the constructions shown in FIGURES 5–7 illustrates an embodiment for use with a hexagonal wrench, FIGURES 8–11 illustrate modifications to FIGURES 5 and 7 necessary to adapt the constructions therein to other rotating and locking devices, such as locking the device by a serrated lockwasher as in FIGURES 8 and 9, or rotating the sleeve by an Allen-head wrench as shown in FIGURES 11 and 12.

As shown in FIGURES 8 and 9, the outer radial portion 148 of the tapered sleeve is externally serrated for cooperation with a similarly internally serrated lockwasher 150 in a manner similar to that of the FIGURE 5 construction. Except for this change and the guide sleeve 151 being extended radially inwardly a greater distance to provide a greater bearing surface for the tapered sleeve, while decreasing the distance between the combustion liner and engine casing to a minimum as well as restricting the cooling air inlet passages 152, the FIGURE 8 construction and operation is for all intents and purposes identical to FIGURE 5, and a further explanation is therefore believed unnecessary.

As shown in FIGURES 11 and 12, the outer radial portion 153 of the tapered sleeve of the FIGURE 7 embodiment is internally grooved at 154 to provide circumferentially spaced slots 156 for cooperation with an Allen-head wrench (not shown) for rotation of the tapered sleeve. Furthermore, the sleeve externally is provided with two slots 158 and 159 having center lines 160 and 162 out of alignment with each other adapted to receive alternately a lug 164 projecting into a central circular opening 166 of the lockwasher 167 as shown in FIGURE 12. In this instance, after the tapered sleeve is rotated by the Allen-head wrench to wedge the sleeve into engagement with the ferrule, and the lockwasher is slipped over the sleeve with the lug 164 in the slot 158, if the elongated holes 168 provided in the lockwasher as in the other constructions then do not align with the circular holes 170 in the casing boss, gasket, sleeve collar and igniter plug mounting flange, the lockwasher can be turned over 180° or turned end to end to present the other slot 159 to receive the lug 164 to thereby align enough of the elongated openings 168 with the circular holes for the insertion therethrough of the cap screws to secure the entire assembly to the casing.

To summarize the assembly and operation of these several embodiments, in FIGURES 1–4, the three piece tapered sleeve 68 is assembled around the "live" or "dummy" igniter plug 60 by the snap ring 72 with the spring 74 between the igniter plug shoulder and the sleeve to wedge the sleeve into the ferrule upon insertion of the sleeve and plug therein. The plug assembly is then bolted to the engine casing.

In FIGURES 5–12, and using FIGURE 5 as illustrative of the others, after the gasket 118 and collared sleeve 114 are positioned on boss 120, the tapered sleeve 88 is inserted through sleeve 114 and the ferrule 86 with the lug 104 passing through the axial slot 102 until it has cleared the ferrule bottom 94. Thereupon, the tapered sleeve is rotated by a hexagonal head-wrench, a serrated tool or an Allen-head wrench, depending upon which construction (FIGURES 5–7, 8–9, or 11–12) is being used, to cause the lug to ride up on the inclined face or cam surface 96 on the bottom of the ferrule until the tapered sleeve is forcefully pulled and wedged into the tapered bore of the ferrule to provide a rigid connection therebetween. The particular lockwasher 108 to be used is then inserted over the cooperating portion of the tapered sleeve in the manner described to lock the same in place, the gasket 124 and igniter plug 128 with its mounting flange 126 are then dropped into place with the plug inserted into the tapered sleeve and therethrough, and the whole assembly is screwed to the engine casing.

While the invention has been illustrated in its preferred embodiments in FIGURES 1–12, it will be clear to those skilled in the art to which this invention pertains that many modifications can be made thereto without departing from the scope of the invention.

What is claimed is:

1. Flame tube locating means comprising a combustion chamber including an annular casing having an opening therein, a flame tube within said casing having an opening therein for the passage of an igniter plug therethrough, a ferrule secured to said tube in said tube opening, said ferrule having ramp means therein, a sleeve movably insertable in said ferrule and having wedge means thereon, an igniter plug removably secured to said casing and insertable through said casing opening and said sleeve, and means on said sleeve engaged by said ferrule biasing said sleeve wedge means into engagement with said ferrule ramp means upon another movement of said sleeve for securing said ferrule and sleeve together to locate said flame tube with respect to said casing.

2. Flame tube locating means comprising an annular casing defining a combustion chamber and having a flame tube therein, said casing and tube each having an opening therein substantially radially aligned with each other, a ferrule secured to said flame tube within said opening, a sleeve movable within said ferrule, an igniter plug removably secured to said casing and projecting through said casing opening and said sleeve, said ferrule and sleeve having internal and external tapers respectively for cooperation together to provide a wedging engagement therebetween upon sliding movement of said sleeve within said ferrule in one direction, and cam and cam surface means on said sleeve and ferrule cooperating together to bias said sleeve into engagement with said ferrule upon another movement of said sleeve to locate said flame tube with respect to said casing.

3. Flame tube locating means comprising a combustion chamber including an annular casing having an opening therein, a flame tube within said casing having an opening therein for the passage of an igniter plug therethrough, a ferrule secured to said tube in said tube opening, an igniter plug removably secured to said casing and insertable through said openings, a sleeve secured to said plug and movably insertable in said ferrule, said sleeve and ferrule having tapered mating surfaces formed thereon to together constitute a wedging surface and wedge means, and spring means biasing said sleeve and ferrule into engagement with each other.

4. Flame tube locating means comprising a combustion chamber including an annular fluid containing casing having an opening therein, a flame tube within said casing having an opening therein for the passage of an igniter plug therethrough, a ferrule secured to said tube in said tube opening, a sleeve movably insertable in said ferrule, an igniter plug removably secured to said casing and insertable through said casing opening and said sleeve and ferrule opening, said sleeve and ferrule having tapered mating surfaces formed thereon together constituting wedging surfaces, and other means formed on said sleeve and ferrule together effecting the biasing of said sleeve into wedging engagement with said ferrule for rigidly securing said ferrule and sleeve together to locate said flame tube with respect to said casing, said sleeve having spaced openings therein for the circulation of chamber fluid therethrough to cool said igniter plug.

5. Flame tube locating means comprising a combustion chamber including an annular fluid containing casing having an opening therein, a flame tube within said casing having an opening therein for the passage of an igniter plug therethrough, a ferrule secured to said tube in said tube opening, a sleeve movably insertable through said ferrule, an igniter plug removably secured to said casing and insertable through said casing opening and said sleeve and ferrule opening, said sleeve and ferrule having tapered mating surfaces formed thereon together constituting wedging surfaces, cam lug and cam means formed on said sleeve and ferrule respectively and together effecting the biasing of said sleeve into wedging engagement with said ferrule for rigidly securing said ferrule and sleeve together to locate said flame tube with respect to said casing, said cam lug extending into said flame tube, and means to cool said cam lug.

6. Flame tube locating means comprising an annular casing defining a combustion chamber and having a flame tube therein, said casing and tube each having an opening therein substantially radially aligned with each other, a ferrule secured to said flame tube within said opening, a sleeve rotatably and slideably movable within said ferrule, an igniter plug removably secured to said casing and projecting through said casing opening and said sleeve, said ferrule and sleeve having cooperating oppositely formed tapered portions thereon to provide a wedging engagement therebetween upon sliding movement of said sleeve within said ferrule in one direction, and cam and cam surface means formed on other portions of said sleeve and ferrule cooperating together to effect the sliding of said sleeve into engagement with said ferrule upon rotation of said sleeve to rigidly locate said flame tube with respect to said casing.

7. Flame tube locating means comprising an annular casing defining a combustion chamber and having a flame tube therein, said casing and tube each having an opening therein substantially radially aligned with each other, a ferrule secured to said flame tube within said opening, a sleeve rotatably and slideably movable within said ferrule, an igniter plug removably secured to said casing and projecting through said casing opening and said sleeve, said ferrule and sleeve having internal and external tapers respectively for cooperation together to provide a wedging engagement therebetween upon sliding movement of said sleeve within said ferrule in one direction, said ferrule having a cam surface thereon at substantially right angles to its tapered surface, said sleeve having a cam thereon engaging said cam surface upon rotation of said sleeve, and rotation of said sleeve forcing said sleeve into engagement with said ferrule to locate said flame tube with respect to said casing.

8. Flame tube locating means comprising an annular casing defining a combustion chamber and having a flame tube therein, said casing and tube each having an opening therein substantially radially aligned with each other, a ferrule secured to said flame tube within said opening, a sleeve movable within said ferrule, an igniter plug removably secured to said casing and projecting through said casing opening and said sleeve, said ferrule and sleeve together having a plurality of sets of cooperating ramp means and wedge means formed thereon for cooperation together to provide a wedging engagement therebetween upon sliding movement of said sleeve within said ferrule in one direction, one of said sets biasing said sleeve into sliding engagement with said ferrule upon movement of said sleeve to wedgingly secure them together upon movement of said sleeve to locate said flame tube with respect to said casing.

9. A flame tube locating means as in claim 5 wherein said means to cool said cam lug comprises an open end fluid flow passage in said sleeve communicating the fluid in said chamber to said lug.

10. Flame tube locating means comprising a combustion chamber including an annular casing having an opening therein, a flame tube within said casing having an opening therein for the passage of an igniter plug therethrough, a ferrule secured to said tube in said tube opening, a sleeve rotatably and slideably movably insertable in said ferrule, an igniter plug removably secured to said casing and insertable through said casing opening and said sleeve and ferrule opening, said sleeve and ferrule having tapered mating surfaces formed thereon together constituting wedging surfaces, and other means formed on said sleeve and ferrule together effecting the biasing of said sleeve into wedging engagement with said ferrule for rigidly securing said ferrule and sleeve together to locate said flame tube with respect to said casing, said other means comprising a cam surface on the edge of said ferrule nearest the longitudinal axis of said chamber, a cam lug secured to a portion of the adjacent edge of said sleeve and adapted to engage said cam surface, rotation of said sleeve forcing said lug against said cam surface to wedgingly move said sleeve into said ferrule.

References Cited in the file of this patent

UNITED STATES PATENTS

| | | |
|---|---|---|
| 2,496,402 | McVeigh | Feb. 7, 1950 |
| 2,692,478 | Hill | Oct. 26, 1954 |
| 2,832,195 | Weissborn | Apr. 29, 1958 |

FOREIGN PATENTS

| | | |
|---|---|---|
| 651,093 | Great Britain | Mar. 14, 1951 |